United States Patent
Cobb et al.

(10) Patent No.: US 10,489,679 B2
(45) Date of Patent: Nov. 26, 2019

(54) VISUALIZING AND UPDATING LONG-TERM MEMORY PERCEPTS IN A VIDEO SURVEILLANCE SYSTEM

(71) Applicant: AVIGILON PATENT HOLDING 1 CORPORATION, Vancouver (CA)

(72) Inventors: Wesley Kenneth Cobb, The Woodlands, TX (US); Bobby Ernest Blythe, Houston, TX (US); Rajkiran Kumar Gottumukkal, Houston, TX (US); Ming-Jung Seow, Houston, TX (US)

(73) Assignee: AVIGILON PATENT HOLDING 1 CORPORATION, Vancouver (CA)

( * ) Notice: Subject to any disclaimer, the term of this patent is extended or adjusted under 35 U.S.C. 154(b) by 0 days.

(21) Appl. No.: 14/337,703

(22) Filed: Jul. 22, 2014

(65) Prior Publication Data
US 2015/0078656 A1    Mar. 19, 2015

Related U.S. Application Data (63) Continuation of application No. 12/551,303, filed on Aug. 31, 2009, now Pat. No. 8,786,702.

(51) Int. Cl.
*H04N 7/18* (2006.01)
*G06K 9/62* (2006.01)
*G06K 9/00* (2006.01)

(52) U.S. Cl.
CPC ....... *G06K 9/6217* (2013.01); *G06K 9/00771* (2013.01); *G06K 9/00973* (2013.01); *H04N 7/18* (2013.01); *H04N 7/183* (2013.01)

(58) Field of Classification Search
CPC ........... H04N 7/18; H04N 7/181; H04N 7/188
(Continued)

(56) References Cited

U.S. PATENT DOCUMENTS

| 4,679,077 A | 7/1987 | Yuasa et al. |
| 5,113,507 A | 5/1992 | Jaeckel |

(Continued)

FOREIGN PATENT DOCUMENTS

| DE | 2338380 A1 | 2/1975 |
| DE | 3337204 A1 | 4/1985 |

(Continued)

OTHER PUBLICATIONS

J Connell et al., "Detection and Tracking in the IBM PeopleVision System," IEEE ICME, Jun. 2004: pp. 1-4, <http://www.research.ibm.com/peoplevision>.

(Continued)

*Primary Examiner* — June Y Sison
*Assistant Examiner* — Adam A Cooney
(74) *Attorney, Agent, or Firm* — BakerHostetler (57) ABSTRACT

Techniques are disclosed for visually conveying a percept. The percept may represent information learned by a video surveillance system. A request may be received to view a percept for a specified scene. The percept may have been derived from data streams generated from a sequence of video frames depicting the specified scene captured by a video camera. A visual representation of the percept may be generated. A user interface may be configured to display the visual representation of the percept and to allow a user to view and/or modify metadata attributes with the percept. For example, the user may label a percept and set events matching the percept to always (or never) result in alert being generated for users of the video surveillance system.

22 Claims, 6 Drawing Sheets

(58) Field of Classification Search
USPC .............. 348/142, 143, 135, 146, 149, 159
See application file for complete search history.

(56) References Cited

U.S. PATENT DOCUMENTS

| | | | |
|---|---|---|---|
| 5,748,775 A | 5/1998 | Tsuchikawa et al. | |
| 5,751,378 A | 5/1998 | Chen et al. | |
| 5,969,755 A * | 10/1999 | Courtney | G06F 17/3079 348/135 |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,628,835 B1 * | 9/2003 | Brill | G06K 9/00335 348/155 |
| 6,658,487 B1 * | 12/2003 | Smith | G06F 9/465 719/316 |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,865,746 B1 | 3/2005 | Herrington et al. | |
| 6,940,998 B2 | 9/2005 | Garoutte | |
| 7,076,102 B2 | 7/2006 | Lin et al. | |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,433,493 B1 * | 10/2008 | Miyoshi et al. | 382/103 |
| 7,436,887 B2 | 10/2008 | Yeredor et al. | |
| 7,825,954 B2 | 11/2010 | Zhang et al. | |
| 7,868,912 B2 | 1/2011 | Venetianer et al. | |
| 2002/0135483 A1 * | 9/2002 | Merheim | G06K 9/00771 340/573.1 |
| 2003/0107650 A1 | 6/2003 | Colmenarez et al. | |
| 2003/0110499 A1 | 6/2003 | Knudson et al. | |
| 2003/0169171 A1 * | 9/2003 | Strubbe et al. | 340/573.1 |
| 2004/0143602 A1 * | 7/2004 | Ruiz et al. | 707/104.1 |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0204388 A1 | 9/2005 | Knudson et al. | |
| 2005/0240629 A1 | 10/2005 | Gu et al. | |
| 2005/0265582 A1 * | 12/2005 | Buehler | G06K 9/00335 382/103 |
| 2006/0018516 A1 | 1/2006 | Masoud et al. | |
| 2006/0165386 A1 | 7/2006 | Garoutte | |
| 2006/0190419 A1 | 8/2006 | Bunn et al. | |
| 2006/0190960 A1 * | 8/2006 | Barker | 725/14 |
| 2006/0222206 A1 | 10/2006 | Garoutte | |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |

FOREIGN PATENT DOCUMENTS

| | | |
|---|---|---|
| EP | 0721253 A2 | 7/1996 |
| EP | 0774866 A2 | 5/1997 |
| EP | 0854645 A2 | 7/1998 |
| GB | 1554411 A | 10/1979 |
| GB | 2034995 A | 6/1980 |
| GB | 2126002 A | 3/1984 |
| GB | 2232031 A | 11/1990 |
| GB | 2264409 A | 8/1993 |
| JP | 59-141878 | 8/1984 |
| JP | 60-061935 | 4/1985 |
| WO | WO 1986/01359 A1 | 2/1986 |
| WO | WO 1989/03085 A1 | 4/1989 |
| WO | WO 1990/07844 A1 | 7/1990 |
| WO | WO 1991/05436 A1 | 4/1991 |
| WO | WO 1994/13107 A1 | 6/1994 |
| WO | WO 1994/14284 A1 | 6/1994 |
| WO | WO 1995/01056 A1 | 1/1995 |
| WO | WO 1995/28799 A1 | 10/1995 |
| WO | WO 1995/32583 A1 | 11/1995 |
| WO | WO 1995/32585 A1 | 11/1995 |
| WO | WO 1996/09721 A1 | 3/1996 |
| WO | WO 1996/13935 A1 | 5/1996 |
| WO | WO 1996/17473 A1 | 6/1996 |
| WO | WO 1996/41478 A1 | 12/1996 |
| WO | WO 1998/26584 A1 | 6/1998 |
| WO | WO 1998/43183 A1 | 10/1998 |
| WO | WO 1998/48566 A2 | 10/1998 |
| WO | WO 1999/01984 A1 | 1/1999 |
| WO | WO 1999/14947 A1 | 3/1999 |
| WO | WO 1999/45701 A1 | 9/1999 |
| WO | WO 2000/05889 A1 | 2/2000 |
| WO | WO 2009/049314 A2 | 4/2009 |

OTHER PUBLICATIONS

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

VISUALIZING AND UPDATING LONG-TERM MEMORY PERCEPTS IN A VIDEO SURVEILLANCE SYSTEM

CROSS-REFERENCE TO RELATED APPLICATION

This application is a continuation of co-pending U.S. patent application Ser. No. 12/551,303 filed Aug. 31, 2009. The aforementioned related patent application is herein incorporated by reference in its entirety.

BACKGROUND OF THE INVENTION

Field of the Invention

Embodiments of the invention provide techniques for conveying information learned by a video surveillance system. More specifically, embodiments of the invention relate to techniques for visualizing and updating long-term memory percepts in a video surveillance system.

Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked frame-to-frame in order to follow the "blob" moving through the scene over time, e.g., a person walking across the field of vision of a video surveillance camera. Further, such systems may be configured to determine when an object has engaged in certain predefined behaviors.

However, such surveillance systems typically require that the objects and/or behaviors which may be recognized by the system to be defined in advance. Thus, in practice, these systems rely on predefined definitions for objects and/or behaviors to evaluate a video sequence. In other words, unless the underlying system includes a description for a particular object or behavior, the system is generally incapable of recognizing that behavior (or at least instances of the pattern describing the particular object or behavior). Thus, what is "normal" or "abnormal" behavior needs to be defined in advance, and separate software products need to be developed to recognize additional objects or behaviors. This results in surveillance systems with recognition capabilities that are labor intensive and prohibitively costly to maintain or adapt for different specialized applications. Accordingly, currently available video surveillance systems are typically unable to recognize new patterns of behavior that may emerge in a given scene or recognize changes in existing patterns. More generally, such systems are often unable to identify objects, events, behaviors, or patterns as being "normal" or "abnormal" by observing what happens in the scene over time; instead, such systems rely on static patterns defined in advance.

SUMMARY OF THE INVENTION

One embodiment of the invention includes a method for a video surveillance system to process a sequence of video frames depicting a scene captured by a video camera. The method may generally include receiving a request to view a visual representation of a percept encoded in a long-term memory of a machine-learning engine. The precept may be used to encode a pattern of behavior learned by the machine-learning engine from analyzing data streams generated from the sequence of video frames. The method may also include retrieving the requested percept from the long-term memory of the machine-learning engine. The long-term memory stores a plurality of percepts. The method may also include generating a visual representation of the requested percepts. The visual representation presents a directed graph representing the pattern of behavior encoded by the requested percept.

Additionally, nodes in the directed graph may be used to represents one or more primitive events observed by the video surveillance system in the sequence of video frames and each links between nodes may represent a relationship between primitive events in the pattern of behavior.

Another embodiment of the invention includes a computer-readable storage medium containing a program which, when executed by a video surveillance system, performs an operation to process a sequence of video frames depicting a scene captured by a video camera. The operation may generally include receiving a request to view a visual representation of a percept encoded in a long-term memory of a machine-learning engine. The precept may be used to encode a pattern of behavior learned by the machine-learning engine from analyzing data streams generated from the sequence of video frames. The operation may also include retrieving the requested percept from the long-term memory of the machine-learning engine. The long-term memory may store a plurality of percepts. The operation may further include generating a visual representation of the requested percept. In general, the visual representation presents a directed graph representing the pattern of behavior encoded by the requested percept.

Still another embodiment of the invention provides a video surveillance system. The video surveillance system may generally include a video input source configured to provide a sequence of video frames, each depicting a scene. The video surveillance system may also include a processor and a memory containing a program, which when executed by the processor is configured to perform an operation to process the scene depicted in the sequence of video frames. The operation may generally include receiving a request to view a visual representation of a percept encoded in a long-term memory of a machine-learning engine. The precept may be used to encode a pattern of behavior learned by the machine-learning engine from analyzing data streams generated from the sequence of video frames. The operation may also include retrieving the requested percept from the long-term memory of the machine-learning engine. The long-term memory may store a plurality of percepts. The operation may further include generating a visual representation of the requested percept. In general, the visual representation presents a directed graph representing the pattern of behavior encoded by the requested percept.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide an interface configured to visually convey information learned by a behavior-recognition system. The behavior-recognition system may be configured to identify, learn, and recognize patterns of behavior by observing and evaluating events depicted by a sequence of video frames. In a particular embodiment, the behavior-recognition system may include both a computer vision engine and a machine learning engine. The computer vision engine may be configured to evaluate a stream of video frames. Typically, each frame of video may be characterized using multiple color (or grayscale) channels (e.g., a radiance value between 0-255 and a set of red, green, and blue (RGB) color channels values, each between 0-255). Further, the computer vision engine may generate a background image by observing the scene over a number of video frames. For example, consider a video camera trained on a stretch of a highway. In such a case, the background would include the roadway surface, the medians, any guard rails or other safety devices, and traffic control devices, etc., that are visible to the camera. Vehicles traveling on the roadway (and any other person or thing engaging in some activity) that are visible to the camera would represent scene foreground objects.

The computer vision engine may compare the pixel values for a given frame with the background image and identify objects as they appear and move about the scene. Typically, when a region of the scene (referred to as a "blob" or "patch") is observed with appearance values that differ substantially from the background image, that region is identified as depicting a foreground object. Once identified, the object may be evaluated by a classifier configured to determine what is depicted by the foreground object (e.g., a vehicle or a person). Further, the computer vision engine may identify features (e.g., height/width in pixels, average color values, shape, area, and the like) used to track the object from frame-to-frame. Further still, the computer vision engine may derive a variety of information while tracking the object from frame-to-frame, e.g., position, current (and projected) trajectory, direction, orientation, velocity, acceleration, size, color, and the like. In one embodiment, the computer vision outputs this information as a stream of "context events" describing a collection of kinematic information related to each foreground object detected in the video frames. Each context event may provide kinematic data related to a foreground object observed by the computer vision engine in the sequence of video frames.

Data output from the computer vision engine may be supplied to the machine learning engine. In one embodiment, the machine learning engine may evaluate the context events to generate "primitive events" describing object behavior. Each primitive event may provide semantic meaning to a group of one or more context events. For example, assume a camera records a car entering a scene, and that the car turns and parks in a parking spot. In such a case, the computer vision engine could initially recognize the car as a foreground object; classify it as being a vehicle, and output kinematic data describing the position, movement, speed, etc., of the car in the context event stream. In turn, a primitive event detector could generate a stream of primitive events from the context event stream such as "vehicle appears," vehicle turns," "vehicle slowing," and "vehicle stops" (once the kinematic information about the car indicated a speed of 0). As events occur, and re-occur, the machine learning engine may create, encode, store, retrieve, and reinforce patterns representing the events observed to have occurred, e.g., long-term memories (or long-term "percepts") representing a higher-level abstraction of a car parking in the scene—generated from the primitive events underlying multiple observations of different cars entering and parking. The interface may be configured to visually convey such patterns. Specifically, the patterns may be stored in a long-term memory of the machine learning engine. Further still, patterns representing an anomalous event (relative to prior observation) or events identified as an event of interest may result in alerts passed to users of the behavioral recognition system.

In one embodiment, the machine learning engine may also include a transaction server. The transaction server may generate a visual representation of percepts encoded in the long-term memory of the machine-learning engine. Thus, the transaction server allows users to explore data learned by the machine-learning engine. Further, the transaction server allows users to supply metadata specifying how the system should respond to certain observed events and/or behaviors (for example, when to produce (or not produce) an alert). For example, the transaction server may receive a request to view percepts stored in the long-term memory generated through observations of a scene over time. A percept may include one or more context events generalizing observations of multiple foreground objects of a scene over time. In response, the transaction server may generate a visual representation of the percept retrieved from the long-term memory. Further, the transaction server may also receive user requests to associate metadata with a percept retrieved from the long-term memory. The metadata may be used to guide system behavior. For example, a user may provide a name for percept, specify a rule that the system should generate an alert (or refrain from generating an alert) when a sequence of events that match a percept is observed, or otherwise modify metadata associated with a percept encoded in the long-term memory.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
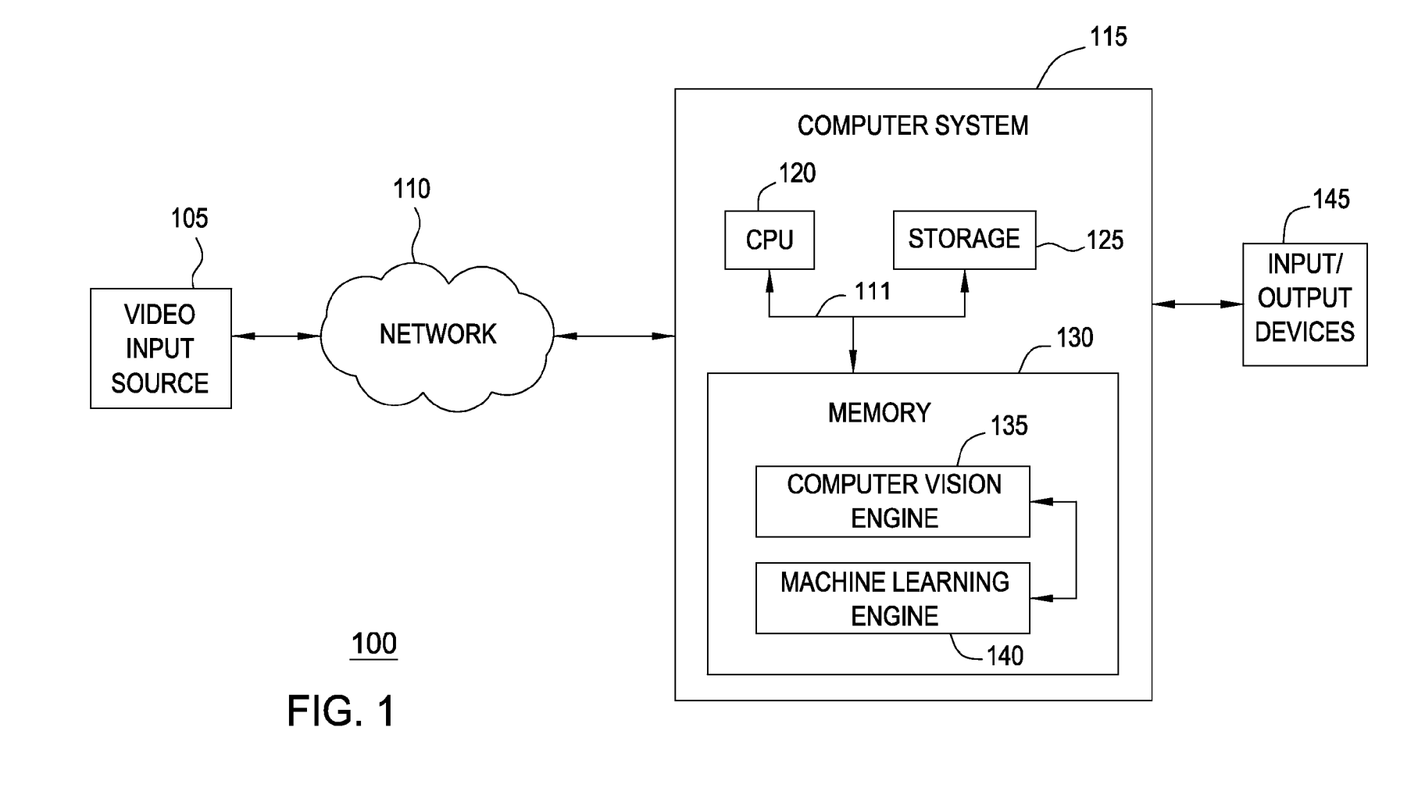
FIG. 1 illustrates components of a video analysis and behavior-recognition system, according to one embodiment of the invention.

FIG. 1 illustrates components of a video analysis and behavior-recognition system 100, according to one embodiment of the invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine-learning engine 140. As described in greater detail below, the computer vision engine 135 and the machine-learning engine 140 may provide software applications configured to process a sequence of video frames provided by the video input source 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like. Additionally, although shown as a single video input source 105, the system 100 may support many video cameras—each observing a distinct scene. Further, each camera may have multiple preset positions (i.e., a single camera may, in fact, be trained on more than one scene). In such cases, a separate instance of the computer vision engine 135 and machine learning-engine 140 may be available to observe the video stream from each camera (and presets, if any).

The computer vision engine 135 may be configured to analyze this raw information to identify active objects in the video stream, classify the objects, derive a variety of metadata regarding the actions and interactions of such objects, and supply this information to a machine-learning engine 140. In turn, the machine-learning engine 140 may be configured to evaluate, observe, learn, and remember details regarding events (and types of events) that transpire within the scene over time.

In one embodiment, the machine-learning engine 140 receives the video frames and the data generated by the computer vision engine 135. The machine-learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI screen. In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 analyzes each frame in real-time to derive a set of information about what is occurring within a given frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application running on another computer system may request (or receive) the results of over network 110.

Figure 2:
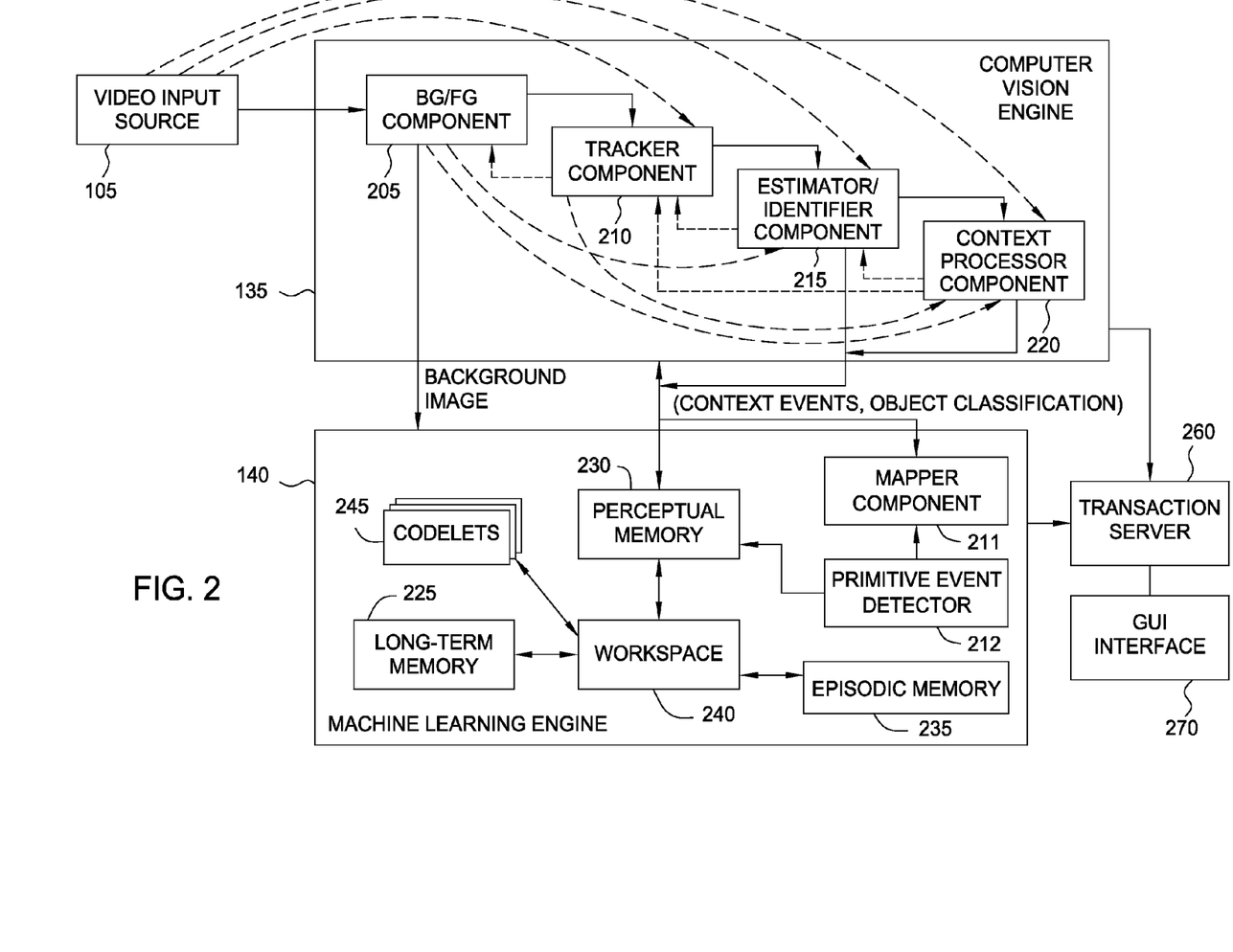
FIG. 2 further illustrates components of a computer vision engine and a machine-learning engine, according to one embodiment of the invention.

FIG. 2 further illustrates components of the computer vision engine 135 and the machine-learning engine 140 first illustrated in FIG. 1, according to one embodiment of the invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case.

In one embodiment, the BG/FG component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channel or radiance channel for black and white video). For example, the BG/FG component 205 may model the background states for each pixel using an adaptive resonance theory (ART) network. That is, each pixel may be classified as depicting scene foreground or scene background using an ART network modeling a given pixel.

Additionally, the BG/FG component 205 may be configured to generate a mask used to identify which pixels of the scene are classified as depicting foreground and, conversely, which pixels are classified as depicting scene background. The BG/FG component 205 then identifies regions of the scene that contain a portion of scene foreground (referred to as a foreground "blob" or "patch") and supplies this information to subsequent stages of the pipeline. Pixels classified as depicting scene background may be used to generate a background image modeling the background of scene.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene. More simply, the tracker attempts to relate the depiction of a particular object in one frame to the depiction of that object in subsequent frames as it moves throughout the scene.

The estimator/identifier component 215 may receive the output of the tracker component 210 (and the BF/FG component 205) and classify each tracked object as being one of a known category of objects. For example, in one embodiment, estimator/identifier component 215 may include a trained classifier configured to classify a tracked object as being a "person," a "vehicle," an "unknown," or an "other."

In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sitting), or an indication of whether the person is carrying an object. Alternatively, the estimator/identifier component 215 may include an unsupervised classifier configured to determine a collection of micro features (e.g., size, color, shininess, rigidity, etc.) and classify observed objects sharing a similar set of micro features as depicting an object of the same type.

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects that have been tracked (by tracker component 210) and classified (by estimator identifier component 215). For example, the context processor component 220 may evaluate a foreground object from frame-to-frame and output context events describing that object's height, width (in pixels), position (as a 2D coordinate in the scene), acceleration, velocity, orientation angle, etc.

The computer vision engine 135 may take the outputs of the components 205, 210, 215, and 220 describing the motions and actions of the tracked objects in the scene and supply this information to the machine-learning engine 140. In one embodiment, the primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context processor component 220 estimates the kinematic data regarding the car's position and velocity. In such a case, this information is supplied to the machine-learning engine 140 and the primitive event detector 212. In turn, the primitive event detector 212 may generate a semantic symbol stream providing a simple linguistic description of actions engaged in by the vehicle. For example, a sequence of primitive events related to observations of the computer vision engine 135 occurring at a parking lot could include "vehicle appears in scene," "vehicle moves to a given location," "vehicle stops moving," "person appears proximate to vehicle," "person moves," person leaves scene" "person appears in scene," "person moves proximate to vehicle," "person disappears," "vehicle starts moving," and "vehicle disappears." As described in greater detail below, the primitive event stream may be used to excite the perceptual associative memory 230.

Illustratively, the machine-learning engine 140 includes a long-term memory 225, a perceptual memory 230, an episodic memory 235, a workspace 240, codelets 245, and a mapper component 211. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream) and a primitive event stream generated by primitive event detector 212. In one embodiment, the perceptual memory 230 may be implemented as a neural network having a graph of nodes and weighted links between nodes. In such a case, the input from the computer vision engine 135 is used to excite the perceptual memory 230, and the resulting sub-graph (i.e., a percept) is copied to the episodic memory 235 as a currently observed event. Thus, each percept may define a sub-graph of a neural network, where each node of the graph represents a primitive event (or combination of primitive events) and links between nodes represent relationships between primitive events.

The episodic memory 235 stores the percept, which represents observed events with details related to a particular episode, e.g., information describing time and space details related on an event. That is, the episodic memory 235 may encode specific details of a particular event, i.e., "what and where" an observed event occurred within a scene.

The long-term memory 225 may store percepts generalizing events observed in the scene. To continue with the example of a vehicle parking, the long-term memory 225 may encode percepts capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, percepts the the episodic memory 235 and the long-term memory 225 may be used to relate and understand a current event, i.e., the new event may be compared with past experience, leading to both reinforcement, decay, and adjustments to the percepts stored in the long-term memory 225, over time. In a particular embodiment, the long-term memory 225 may be implemented as an ART network and a sparse-distributed memory data structure.

The mapper component 211 may receive the context event stream and the primitive event stream and parse information to multiple ART networks to generate statistical models of what occurs in the scene for different groups of context events and primitive events.

Generally, the workspace 240 provides a computational engine for the machine-learning engine 140. For example, the workspace 240 may be configured to copy percepts from the perceptual memory 230, retrieve relevant memories from the episodic memory 235 and the long-term memory 225, select and invoke the execution of one of the codelets 245. In one embodiment, each codelet 245 is a software program configured to evaluate different sequences of events and to determine how one sequence may follow (or otherwise relate to) another (e.g., a finite state machine). More generally, the codelet may provide a software module configured to detect interesting patterns from the streams of data supplied to the machine-learning engine 140. In turn, the codelet 245 may create, retrieve, reinforce, or modify metadata related to percepts in the episodic memory 235 and the long-term memory 225. By scheduling codelets 245 for execution, copying percepts to/from the workspace 240, the machine-learning engine 140 performs a cognitive cycle used to observe, and learn, about patterns of behavior that occur within the scene.

As shown in FIG. 2, the machine-learning engine 140 also includes a transaction server 260 and a GUI interface 270. In one embodiment, the transaction server 260 and GUI tool 270 allow users to retrieve and generate visualizations of percepts encoded by the long term memory 225. For example, the transaction server 260 may be configured to processes user requests from the GUI tool 270 to generate and display a visualization of a percept encoded in the long-term memory. Table I shows examples of transactions that may be supported by the transaction server 260:

TABLE I

Transactions supported by the transaction server

| Transaction | Description |
| --- | --- |
| Get preset list | Obtain a list of presets for a specified camera |
| Get list of percepts | Obtain a list of percepts for a specified preset |
| Get percept | Obtains data for a specified percept (e.g., including properties) |
| Set always alert | Specifies to always alert on event(s) matching a specified percept |
| Set always ignore | Specifies to never alert on event(s) matching a specified percept |
| Modify metadata property | Modify a specified property of a percept |

Note, while FIG. 2 shows the transaction server 260 as being separate from the machine learning engine 140, those skilled in the art will recognize that the transaction server 260 may readily be integrated as part of the machine learning engine 140. For example, the transactions supported by the transaction server may be implemented as an API provided by the long-term memory. In such case, the GUI tool 270 may be configured to query the long term-memory to retrieve the percepts encoded therein for one of the camera percepts.

Figure 3:
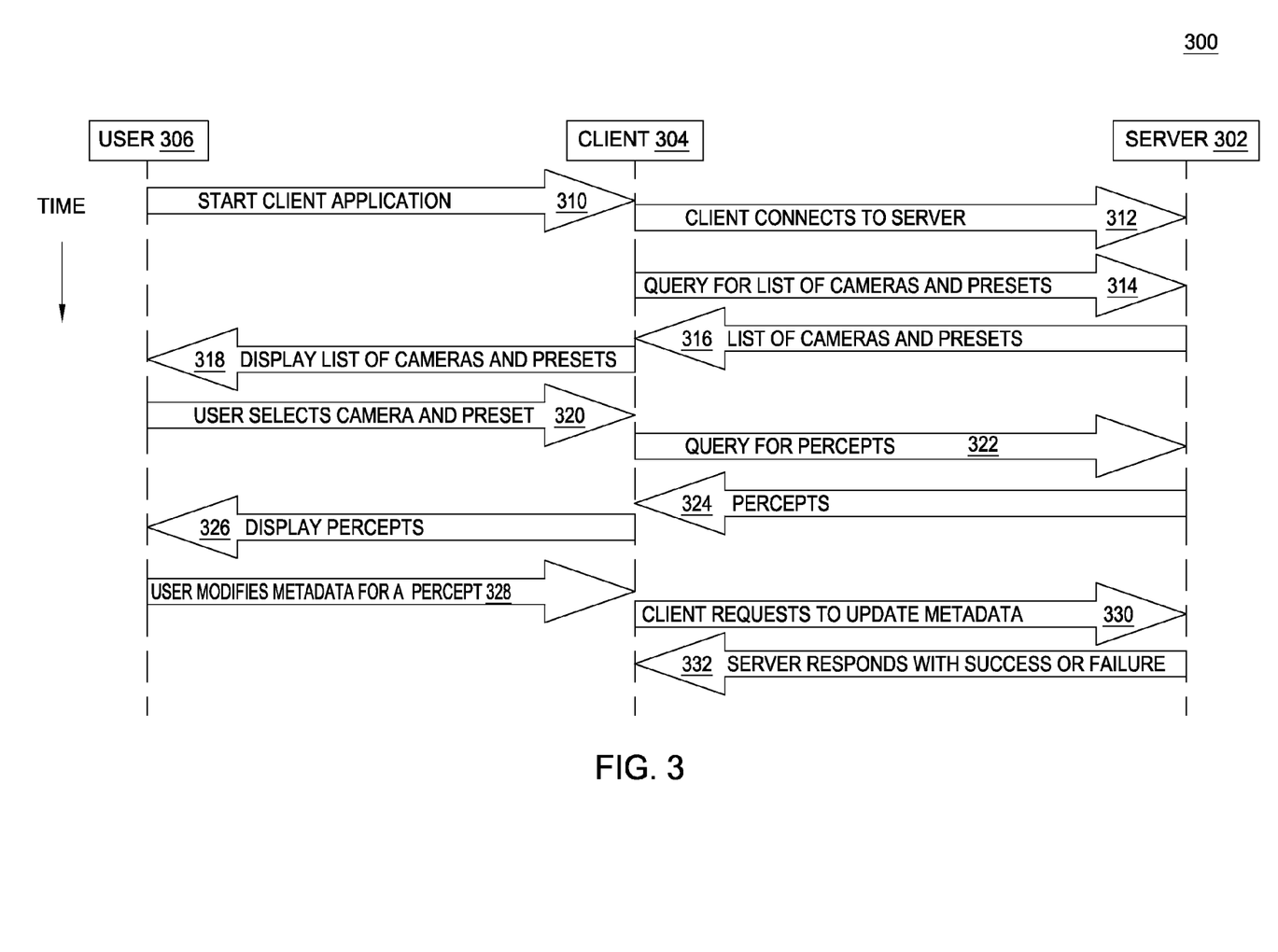
FIG. 3 illustrates a sequence of interactions between a transaction server and a client, according to one embodiment of the invention.

FIG. 3 illustrates a sequence of interactions between a transaction server 260 and a client 304 performed to provide a user 306 with a visualization of a percept in long-term memory of the machine-learning engine, according to one embodiment of the invention. In one embodiment, the transaction server 260 may listen for client requests on a specified port (e.g., via the Berkeley sockets application programming interface (API) over Transmission Control Protocol/Internet Protocol (TCP/IP)). Further, the client 304 and the transaction server 260 may communicate using any application-layer network protocol such as Hypertext Transfer Protocol (HTTP), File Transfer Protocol (FTP), Simple Object Access Protocol (SOAP), etc. Further still, each request to and/or response from the transaction server 260 may be in a standard format such as Extensible Markup Language (XML).

As shown, the method 300 begins at step 310, where the user 306 invokes the client 304. At step 312, a user interacts with the client 304 to connect to the transaction server 260. For example, the client 304 may connect to a specified IP address and port number on which the transaction server 260 is listening. At step 314, the client 304 queries for a list of cameras and associated presets 316. Each preset may include a location and orientation of a video camera observing (or having observed) a scene. At step 316, the transaction server 260 returns a list of cameras and presets to the client 304. At step 318, the client 304 displays the list of cameras and presets to the user 306.

At step 320, the user 306 selects a camera and a preset. The client 304 then queries for a list of percepts from the server 302 for the selected camera and preset (step 522). At step 324, the server 302 returns the list of percepts to the client 304. Alternatively, the server 302 may be configured to return a list of long-term memory percepts for a currently active scene being observed by the computer vision engine 1325 and machine-learning engine 140. At step 326, the client 304 displays the list of percepts to the user 306. The 306 may select a percept from the list. The client 304 may then display properties associated with the selected percept. The properties may include an identifier for the percept, a label for the percept, a measure of how strongly reinforced the percept is, alert preferences for the percept, etc. The client 304 may also allow the user 306 to modify one or more metadata properties for a percept. For example, a user 306 may modify a label for a percept to customize how the GUI tool 270 conveys information for the percept.

At step 328, the user 306 modifies metadata for a percept via the client 304. For example, the user 306 may modify metadata related to a selected percept (e.g., a name, an alert rule, etc.). At step 330, the client 304 sends a request to the server 302 to update the percept. At step 332, the server 302 attempts to update the metadata for the percept and returns a result to the client 304 indicating success or failure of the attempted update. After the step 332, the method 300 terminates.

Figure 4:
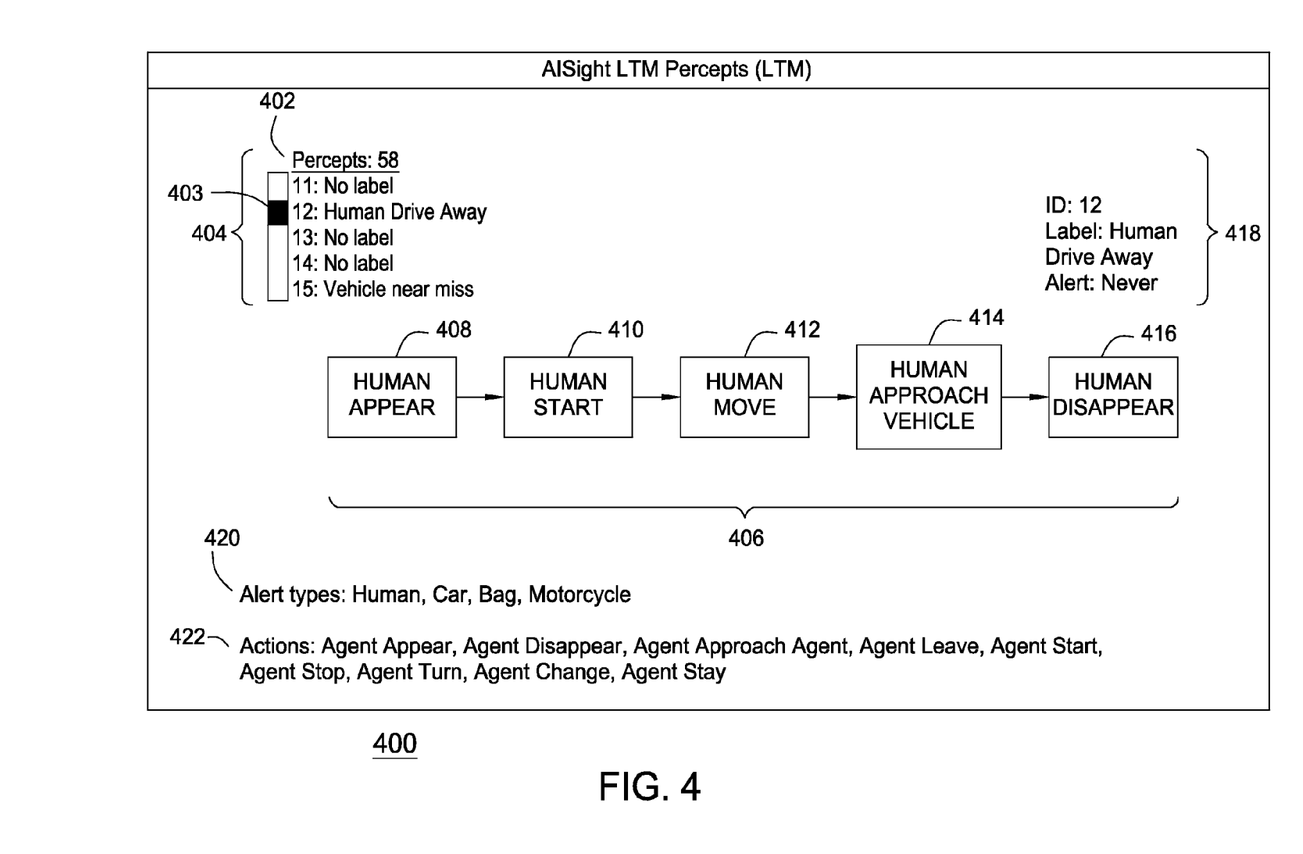
FIG. 4 illustrates a graphical user interface (GUI) conveying a percept, according to one embodiment of the invention.

FIG. 4 illustrates an example of a graphical user interface display (GUI) 400 presenting a visualization of a percept encoded in the long-term memory of a machine learning engine, according to one embodiment of the invention. As shown, the GUI 400 includes a count 402 of percepts for a specified scene, a list 404 of percepts for the specified scene, a visual representation 406 of a selected percept, properties 420 associated with a selected percept, agent types 420, and actions 422. As shown, the count 402 indicates that the long-term memory 230 of the machine-learning engine 140 stores fifty-eight percepts for the specified scene. Further, a user may navigate through the list 404 of the fifty-eight percepts (e.g., using arrow keys of a keyboard or using a scroll bar 403 of the GUI 400). The user may view the list 404 and/or select a percept from the list 404. Further, the user may also specify a filter condition for the list 404. For example, the user may specify to only show strongly reinforced percepts in the list 404—or may request to list only percepts that include a specified primitive event.

Once the user selects a percept, the GUI interface tool may display a visual representation of the percept. For example, GUI 400 shows a visualization of a long-term memory percept, labeled "Human Drives Away." In one embodiment, the percept may be visually represented as a connected sequence of primitive events. Further, each primitive event may be represented as a box labeled with a name for the primitive event.

As discussed above, the percept itself may be a representation of a sub-graph of a neural network, where each node of the graph represents a primitive event (or combination of primitive events) and links between nodes represent relationships between primitive events. For example, the primitive events may correspond to a basic units of behavior such as a foreground object being observed to "start," "stop," "turn," "accelerate," "decelerate," "appear," or "disappear," etc. As this example illustrates, the primitive events may provide a collection verbs describing a suite of basic actions that the video surveillance system can detect agents (i.e., foreground objects) engaging in. Further, because the video surveillance system may be configured to classify a given agent acting within a scene (e.g., as being a vehicle or person)—the combination of an agent classification along with a primitive event provides the basic building blocks for a percept as well as for a visualization of such a percept used to convey a semantic description of learned patterns of behavior. For example, an analysis of a sequence of video frames could lead to the following percept generated from an agent/primitive event stream: vehicle-appear→vehicle-decelerate→vehicle-slow→vehicle stop. Thus, this example illustrates that each node may be associated with semantic labels describing the agents acting with in a scene, as represented by the primitive events. In one embodiment, traversing the nodes of a percept encoded in the long-term memory, allows a clause describing a higher-order of behavior to be generated. For example, as shown in FIG. 4, percept number twelve includes five primitive events in an order corresponding to the order of an underlying percept in the long term memory; namely, Human Appear 408, Human Start 410, Human Move 412, Human Approach Vehicle 414, and Human Disappear 416.

Thus, as can be observed in GUI 400, the name for each primitive event provides an action which itself is associated with one or more agents in the scene. Further, the sequence is represented by arrows between the boxes (i.e., according to the order of the percept). As shown, the GUI 400 also displays properties of the selected percept, according to one embodiment. For example, properties 418 for the selected percept include an identifier for the percept (i.e., 12), a label for the percept (i.e., "Human Drives Away"), and alert settings for the cluster 604 (i.e., "Never").

In one embodiment, a user may modify the label (or other metadata) for the percept. The user may also set the machine-learning engine 140 to alert whenever the machine-learning engine determines that a series of event matching the percept has occurred. Further, the GUI 400 may also display a list 420 of agent types. For example, the list 420 of agent types may include a human, a car, a bag, and a motorcycle. Further, the GUI 400 may display a list 422 of primitive events. Illustratively, the list 422 of primitive events shown in GUI 400 includes an agent appearing, an agent disappearing, a first agent approaching a second agent, an agent leaving, an agent starting, an agent stopping, an agent turning, an agent changing, and an agent staying. Those skilled in the art will recognize that other agent types and actions may be supported by embodiments of the invention.

Figure 5:
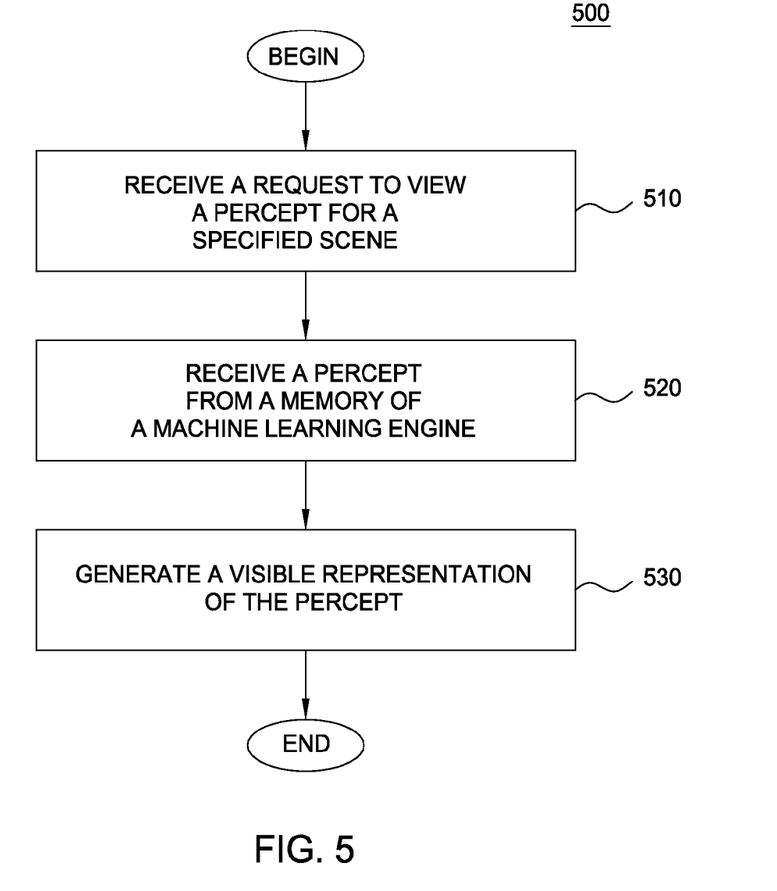
FIG. 5 illustrates a method for generating a visualization of a percept, according to one embodiment of the invention.

FIG. 5 illustrates a method 500 for generating a visual representation of a percept encoded by the long-term memory of a video surveillance system, according to one embodiment of the invention. As shown, the method 500 begins at step 510, where the transaction server 260 receives a request to view a percept for a specified scene. For example, a user may specify a camera and a preset for the camera for which the user desires to view the percept. The user may then select a percept stored in long-term memory from a list of percepts provided by the transaction server 260 for the specified camera and preset. At step 520, the transaction server 260 retrieves the percept from the long-term memory 230 of the machine-learning engine 140. As discussed above, the machine-learning engine 140 may have derived the percept through observation of data streams generated from computer vision engine itself observing a sequence of video frames depicting a scene captured by a video camera. Further, the percept may encode a graph or graph-like structure which includes nodes and links between nodes, and the nodes themselves may be associated with semantic labels, allowing the transaction server 260 to generate a description of the events encoded by the percept. Accordingly, at step 530, the transaction server 260 generates a visual representation of the percept. For example, the transaction server 260 may generate boxes for each node of the percept, where each box includes a semantic label assigned to the node and arrows representing the relationships or sequence of primitive events encoded by the percept in long-term memory. Further, the GUI tool 270 may be configured to allow the user to view and/or modify metadata properties of any percept selected by the user. The transaction server 260 may then output the visual representation to a graphical display. After step 530, the method 500 terminates.

Figure 6:
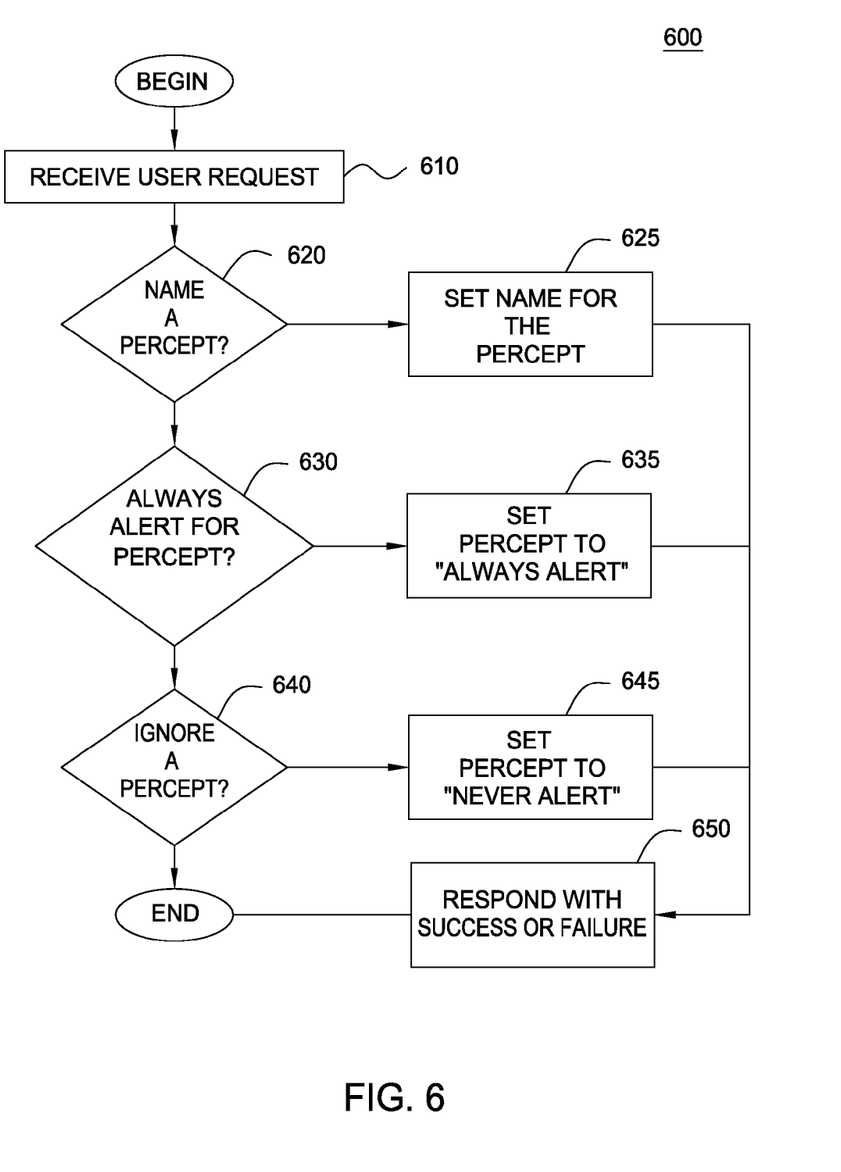
FIG. 6 illustrates a method for modifying metadata properties of a percept, according to one embodiment of the invention.

FIG. 6 illustrates a method 600 for modifying metadata properties of a percept encoded in the long-term memory of a video surveillance system, according to one embodiment of the invention. As shown, the method 600 begins at step 610, where the transaction server 260 receives a user request to modify metadata of the percept. If the user request is to name a percept (step 620), the transaction server 260 may set the name for the percept (step 625). If the user request is to always alert for a percept (step 630), the transaction server 260 may set the machine-learning engine 140 to always alert when a series of primitive events matching the percept is observed (step 635). If the user request is to ignore a percept (step 640), the transaction server 260 may set the machine-learning engine 140 to never alert when a series of context events matching the percept is observed (step 645). Further, the user may also request to modify other metadata attributes associated with a percept. After the steps 625, 635, or 645, the transaction server 260 may respond with a success or failure of servicing the user request (step 650). After the steps 640 or 650, the method 600 terminates.

Advantageously, embodiments of the invention provide users with a visualization of data observed by a machine-learning engine of a behavior recognition system. Further, the visualization may provide an interface used to guide system behavior. In one embodiment, a GUI tool allows a user to visualize and specify metadata attributes related to percepts encoded as long-term memories within a long-term memory of a video surveillance system. For example, users may specify that observations that match an existing percept in the long-term memory should always (or never) result in an alert. Further, the GUI tool may allow users to modify other various metadata attributes associated with a percept, including semantic labels used to name the percept or to name nodes or links between nodes in the percept.

While the foregoing is directed to embodiments of the present invention, other and further embodiments of the invention may be devised without departing from the basic scope thereof, and the scope thereof is determined by the claims that follow.

What is claimed is:

1. A computer-implemented method for a video surveillance system to process a sequence of video frames depicting a scene captured by a video camera, comprising:
   receiving a request to view a visual representation of a percept encoded in a long-term memory of a machine-learning engine, wherein the percept is a representation of a subgraph of a neural network, and the percept includes at least two linked primitive events encoding a pattern of behavior learned by the machine-learning engine from analyzing data streams generated from the sequence of video frames;
   retrieving the requested percept from the long-term memory of the machine-learning engine, wherein the long-term memory stores a plurality of percepts; and
   generating a visual representation of the requested percept for display in a graphical user interface, wherein the visual representation presents a flow chart of a time ordered connected sequence of primitive events representing the pattern of behavior encoded by the requested percept.

2. The computer-implemented method of claim 1, wherein the flow chart includes one or more nodes and links between the nodes, wherein each node represents one or more of the at least two linked primitive events observed by the video surveillance system in the sequence of video frames and wherein each link represents a relationship between the at least two linked primitive events in the pattern of behavior.

3. The computer-implemented method of claim 2, wherein generating the visual representation comprises:
   retrieving a semantic label associated with each node of the flow chart; and
   generating, from the retrieved semantic labels, a clause describing the at least two linked primitive events and the links between the at least two linked primitive events.

4. The computer-implemented method of claim 1, further comprising:
   receiving user input requesting to modify a metadata attribute of the requested percept; and
   modifying the metadata attribute of the requested percept, based on the received user input.

5. The computer-implemented method of claim 4, wherein the metadata attribute is a user-specified name for the requested percept.

6. The computer-implemented method of claim 4, wherein the metadata attribute specifies to publish an alert message upon detecting, from the data streams, an observation of the learned pattern of behavior corresponding to the requested percept.

7. The computer-implemented method of claim 4, wherein the metadata attribute specifies to not publish an alert message upon detecting, from the data streams, an observation of the learned pattern of behavior corresponding to the requested percept.

8. The computer-implemented method of claim 1, further comprising:
   retrieving, from the long-term memory, a list of the plurality of percepts for the scene; and
   displaying the retrieved list of percepts, wherein the requested percept is selected from the displayed list of percepts.

9. A non-transitory computer-readable storage medium containing a program which, when executed by a video surveillance system, performs an operation to process a sequence of video frames depicting a scene captured by a video camera, the operation comprising:
   receiving a request to view a visual representation of a percept encoded in a long-term memory of a machine-learning engine, wherein the percept is a representation of a subgraph of a neural network, and the percept includes at least two linked primitive events encoding a pattern of behavior learned by the machine-learning engine from analyzing data streams generated from the sequence of video frames;
   retrieving the requested percept from the long-term memory of the machine-learning engine, wherein the long-term memory stores a plurality of percepts; and
   generating a visual representation of the requested percept for display in a graphical user interface, wherein the visual representation presents a flow chart of a time ordered connected sequence of primitive events representing the pattern of behavior encoded by the requested percept.

10. The non-transitory computer-readable storage medium of claim 9, wherein the flow chart includes one or more nodes and links between the nodes, wherein each node represents one or more of the at least two linked primitive events observed by the video surveillance system in the sequence of video frames and wherein each link represents a relationship between the at least two linked primitive events in the pattern of behavior.

11. The non-transitory computer-readable storage medium of claim 10, wherein generating the visual representation comprises:
    retrieving a semantic label associated with each node of the flow chart; and
    generating, from the retrieved semantic labels, a clause describing the at least two linked primitive events and the links between the at least two linked primitive events.

12. The non-transitory computer-readable storage medium of claim 9, wherein the operation further comprises:
    receiving user input requesting to modify a metadata attribute of the requested percept; and
    modifying the metadata attribute of the requested percept, based on the received user input.

13. The non-transitory computer-readable storage medium of claim 12, wherein the metadata attribute is a user-specified name for the requested percept.

14. The non-transitory computer-readable storage medium of claim 12, wherein the metadata attribute specifies to publish an alert message upon detecting, from the data streams, an observation of the learned pattern of behavior corresponding to the requested percept.

15. The non-transitory computer-readable storage medium of claim 12, wherein the metadata attribute specifies to not publish an alert message upon detecting, from the data streams, an observation of the learned pattern of behavior corresponding to the requested percept.

16. A video surveillance system, comprising:
    a video input source configured to provide a sequence of video frames, each depicting a scene;
    a processor; and
    a memory containing a program, which when executed by the processor is configured to perform an operation to process the scene depicted in the sequence of video frames, the operation comprising:
        receiving a request to view a visual representation of a percept encoded in a long-term memory of a machine-learning engine, wherein the percept is a representation of a subgraph of a neural network, and the percept includes at least two linked primitive events encoding a pattern of behavior learned by the machine-learning engine from analyzing data streams generated from the sequence of video frames,
        retrieving the requested percept from the long-term memory of the machine-learning engine, wherein the long-term memory stores a plurality of percepts, and
        generating a visual representation of the requested percept for display in a graphical user interface, wherein the visual representation presents a flow chart of a time ordered connected sequence of primitive events representing the pattern of behavior encoded by the requested percept.

17. The system of claim 16, wherein the flow chart includes one or more nodes and links between the nodes, wherein each node represents one or more of the at least two linked primitive events observed by the video surveillance system in the sequence of video frames and wherein each link represents a relationship between the at least two linked primitive events in the pattern of behavior.

18. The system of claim 17, wherein generating the visual representation comprises:
    retrieving a semantic label associated with each node of the flow chart; and
    generating, from the retrieved semantic labels, a clause describing the at least two linked primitive events and the links between the at least two linked primitive events.

19. The system of claim 16, wherein the operation further comprises:
    receiving user input requesting to modify a metadata attribute of the requested percept; and
    modifying the metadata attribute of the requested percept, based on the received user input.

20. The system of claim 19, wherein the metadata attribute is a user-specified name for the requested percept.

21. The system of claim 19, wherein the metadata attribute specifies to publish an alert message upon detecting, from the data streams, an observation of the learned pattern of behavior corresponding to the requested percept.

22. The system of claim 19, wherein the metadata attribute specifies to not publish an alert message upon detecting, from the data streams, an observation of the learned pattern of behavior corresponding to the requested percept.

* * * * *